Patented Apr. 30, 1946

2,399,262

UNITED STATES PATENT OFFICE 2,399,262

EXTRUDABLE POLYMER COMPOSITION

Robert M. Thomas, Union, and Francis P. Baldwin, Pluckemin, N. J., assignors, by mesne assignments, to Jasco, Incorporated, a corporation of Louisiana No Drawing. Application June 19, 1941, Serial No. 398,751

12 Claims. (Cl. 260—23)

This application relates to synthetic rubber-like substances; relates particularly to high molecular weight polymers of an isoolefin such as isobutylene with a diolefin such as butadiene; and relates particularly to internal lubricants for improving the plasticity and properties of flow of the rubbery polymer material.

It has been found possible to produce high molecular weight, synthetic polymers of an isoolefin such as isobutylene with a diolefin such as butadiene or isoprene or piperylene or dimethyl butadiene by the use of a low temperature technique, in which the mixed olefins are cooled to temperatures ranging from −20° C. to −100° C. or −150° C., or even lower, by such procedures as the admixture with the mixed olefins of a diluent-refrigerant such as liquid ethylene or other low boiling liquid hydrocarbon substance, or by the use of solid carbon dioxide or by powerful refrigeration of the reactor, and applying to the cooled mixture a dissolved active metal halide catalyst, or Friedel-Crafts type catalyst, such as aluminum chloride or aluminum bromide or titanium tetrachloride or the like, dissolved in a low freezing, inert solvent such as ethyl or methyl chloride or carbon disulfide. The catalyst is preferably sprayed on to the surface of the rapidly stirred olefinic mixture, and the reaction occurs within a relatively very few minutes.

This material as polymerized has a low unsaturation, usually measured by an iodine number ranging from 1 to 40 or 50, and usually has a molecular weight above 15,000, preferably within the range of about 40,000 to about 150,000 or even higher. The material, in spite of its relatively low unsaturation, shows the property of reactivity with sulfur to produce a cured material having an elastic limit, a tensile strength at break ranging from 1,000 to 5,000 pounds per square inch and an elongation at break ranging from 500% to 1200%.

The material as polymerized has a definite fluidity and cold flow. However, it has been found in general exceedingly difficult to extrude as tubing, electrical insulation, tire bands, inner tube stock and the like because of its tough, relatively unyielding character. The material is unlike natural rubber, in that it is not possible to break down the molecular weight of the polymer on the mill, as is done with rubber, and then restore the molecular weight to approximately its original value by a vulcanization reaction. Instead, the molecular weight, once obtained in the polymerization reaction, must be maintained, since if it is degraded even in small part, in any way, it is apparently lost and the material cannot be repolymerized. This may be in part due to the relatively low unsaturation and may in part be due to the fact that the synthetic polymer does not cure in the same manner as does natural rubber.

The present invention provides an internal lubricant, adapted to be mixed with the polymer and, when so mixed, to permit of easy flow and easy extrusion, both in the extruding machine and on the mill, whereby smooth, easy working is obtained and smooth, accurately sized tubes and extrusion products are obtained.

The invention consists of a new composition of matter consisting of the low temperature isoolefin-diolefin polymer in combination with an internal lubricant such as the hydroxy stearic acid condensation products which are inner esters of the hydroxy stearic acid, or diglycol stearate or butyl stearate or aluminum stearate or hydrogenated castor oil, hydrogenated voltolized oils and the like, together with sulfur, curing aids, fillers, pigments, and the like.

Thus an object of the invention is to soften and plasticize a low temperature isoolefin-polyolefinic rubber-like material by the incorporation therein of an internal lubricant. Other objects and details of the invention will be apparent from the following description.

In practicing the invention, a mixture of from 70 to 99 parts of an isoolefin such as isobutylene with from 30 to 1 part of a diolefin such as butadiene is prepared, as suggested in the copending application of Sparks and Thomas, Serial No. 182,252 filed December 29, 1937 for Copolymers and manufacture thereof; the diolefin preferably being selected from such substances as butadiene, piperylene, isoprene, dimethyl butadiene and homologues thereof. Similarly, polyolefins such as myrcene, hexatriene, etc., may be employed instead of diolefins to give desirable interpolymers for the purpose of the present invention. The mixture is then cooled to temperatures ranging from −20° to −100° or −150° C. or even lower by the application to the mixture of diluent-refrigerants such as liquid ethylene, liquid methane, either alone or in admixture with liquid ethane, liquid propane or the like. Alternatively, various inert diluents such as butane, the alkyl halides and the like may be used, and the reactor strongly cooled, exteriorly. Or an excess of solid carbon dioxide may be added to the olefinic mixture, with or without a diluent such as liquid propane, the alkyl halides, liquid butane and the like. To the rapidly stirred, cooled mixture, there is then added the dissolved active metal halide catalyst or Friedel-Crafts type catalyst such as aluminum chloride, or aluminum bromide, or titanium tetrachloride or the like, dissolved in a low freezing, inert solvent such as ethyl or methyl chloride or carbon disulfide or the like. The reaction proceeds quickly and is usually from 60% to 80% complete within a few minutes, depending upon the scale of operation, catalyst strength, rate of catalyst additions, and similar factors. When the reaction has reached a desired stage of completion, the catalyst is preferably quenched by the addition to the reaction mixture of approximately 1/16 volume or less of an alcohol such as ethyl, methyl or propyl alcohol or other equivalents such as an aldehyde, an ether or an organic acid, as well as ammonia and alkaline solutions.

The resulting polymer generally has a molecular weight within the range of 40,000 to about 80,000, but may have a molecular weight as low as 15,000, or as high as 150,000 or higher. It is definitely an unsaturated substance and has an iodine number within the range of from 1 to 40 or 50. It is an essentially colorless, rubbery, plastic material having many of the physical characteristics of crude rubber.

In addition, the polymer is reactive with sulfur for a curing reaction which destroys the fluidity and develops instead a definite elastic limit at which the material has a tensile strength ranging between 1,000 and 5,000 pounds per square inch and an elongation at break of from 500 to 1200%. The material shows a very high ozone resistance, a very high resistance to acids and alkalies; shows a very high electrical resistance, a low electrical power factor and a low loss factor, a very high flexure resistance and other valuable and desirable physical characteristics. As above pointed out, however, it does not extrude or calender as well as is generally required for commercial processing.

*Example 1*

According to the invention, the polymer prepared as above outlined, was compounded according to the following formula:

| | Parts |
|---|---|
| Polymer | 150 |
| Aluminum stearate | 37.5 |
| Sulfur | 3 |
| Zinc oxide | 7.5 |
| Stearic acid | 4 |
| Gilder's whiting | 37.5 |
| Tetraisobutylene | 10.5 |
| Tuads (tetramethyl thiuram disulfide) | 1.5 |

In preparing this compound, the polymer and the aluminum stearate were combined upon the hot roll mill at a temperature of approximately 135° C. The mill was then cooled to a temperature of approximately 40° C. and the remaining items of the formula incorporated.

The compounded material was then extruded in a standard tube machine and was found to extrude satisfactorily at temperatures ranging from 95° C. to 130° C. It was found to extrude at a good rate of speed and to extrude in a smooth condition with sufficient strength to maintain its shape with no tendency to collapse. This material was then cured at a temperature of approximately 145° C. for a period of time of approximately 30 minutes and was found to yield a highly satisfactory, fully cured, smooth, strong tube, while retaining the full tensile strength and the full elongation of the original polymer.

This is in sharp contrast to the ordinary compound lacking the aluminum stearate, since the simple compound without aluminum stearate is ropey and extrudes with great difficulty, only at a slow rate of speed and very roughly to yield a tube which is not fully satisfactory. Under similar conditions at a temperature of 200° F., only 14 inches of tubing were delivered per minute for the usual formulation, whereas with the aluminum stearate formulation, a delivery rate of about 34 inches were obtained per minute.

The function of the aluminum stearate is that of an internal lubricant to give smoothness to the extruding and to reduce expansion of the extruded stock as it leaves the extrusion die. The tetraisobutylene, which is a liquid, relatively non-volatile polymer, serves to soften the polymer and increase the extrusion rate. The tetraisobutylene, which dissolves in the polymer, has a softening action, increases the rate of extrusion and reduces the extrusion pressure, but it does not affect the smoothness of extrusion nor the expansion of the tube as it leaves the extruding die.

*Example 2*

The polymer prepared as above described was compounded with diglycol stearate according to the following formula:

| | Parts |
|---|---|
| Polymer | 100 |
| Diglycol stearate | 25 |
| Sulfur | 2 |
| Zinc oxide | 5 |
| Stearic acid | 3 |
| Gilder's whiting | 25 |
| Tuads | 1 |

This compound was prepared as described in Example 1, by working the diglycol stearate into the polymer on the hot mill, after which the mill was cooled and the sulfur, zinc oxide, stearic acid and whiting added to the compound on the cold mill with the Tuads added last.

This material likewise extruded smoothly and rapidly to yield a satisfactory tube.

*Example 3*

The polymer prepared as above described was compounded with a low molecular weight, oily condensation product of p-hydroxy stearic acid according to the following formula:

| | Parts |
|---|---|
| Polymer | 100 |
| Low molecular weight hydroxy stearic acid inner ester | 20 |
| Sulfur | 2 |
| Zinc oxide | 5 |
| Stearic acid | 3 |
| Gilder's whiting | 25 |
| Tuads | 1 |

This compound was prepared as described in Example 1, by working the hydroxy stearic acid inner ester into the polymer on the hot mill, after which the mill was cooled and the sulfur, zinc oxide, stearic acid and whiting added to the compound on the cold mill with the Tuads added last.

This material likewise extruded smoothly, easily and rapidly to yield a satisfactory tube.

*Example 4*

The polymer prepared as above described was compounded with a high molecular weight, rubbery appearing hydroxy stearic acid condensate according to the following formula:

| | Parts |
|---|---|
| Polymer | 100 |
| High molecular weight hydroxy stearic acid condensate | 20 |
| Sulfur | 2 |
| Zinc oxide | 5 |
| Stearic acid | 3 |
| Gilder's whiting | 25 |
| Tuads | 1 |

This compound was prepared as described in Example 1, by working the hydroxy stearic acid condensate into the polymer on the hot mill, after which the mill was cooled and the sulfur, zinc oxide, stearic acid and whiting added to the compound on the cold mill with the Tuads added last.

This material likewise extruded smoothly, easily and rapidly to yield a satisfactory tube.

*Example 5*

All of these compounds, particularly the compounds with hydroxy stearic acid condensate, as in Examples 3 and 4, have very advantageous electric properties; the following table being typical:

| | Blank | Blank+ hydroxy stearic acid |
|---|---|---|
| Dielectric constant (E') at 60 cycles/sec | 2.25 | 2.48 |
| Loss factor (E'') at 60 cycles/sec | 0.00173 | 0.00191 |
| D. C. resistivity | 00 | 00 |

This table shows that the polymer alone has highly advantageous electric characteristics which are not harmed by the presence of the extrusion aids.

The above examples disclose merely the extrusion of the polymer compound in tubular form. It is, however, equally advantageous for the extrusion of electrical insulation upon electrical conductors for insulating material, and in view of the high physical and electrical properties, it is an exceedingly advantageous insulating material, either for solid conductors, for low tension or high tension service, or particularly for stranded, flexible conductors, for portable service, especially for portable service to mining machinery, construction equipment, stage equipment and the like.

Thus an object of the invention is to improve the extrusion characteristics of a rubbery, low temperature, synthetic polymer, while retaining high grade physical, chemical and electrical properties in the compounded polymer.

While there are above disclosed but a limited number of embodiments of the invention, it is possible to produce still other embodiments without departure from the inventive concept herein disclosed, and it is, therefore, desired that only such limitations be imposed upon the appended claims as are stated therein or required by the prior art.

The invention claimed is:

1. Process of softening a solid, plastic hydrocarbon interpolymer compound which is reactive with sulfur to give an elastic product prepared by reacting together a major proportion of isobutylene with a minor proportion of a low molecular weight aliphatic diolefin having 4 to 6, inclusive, carbon atoms per molecule in the presence of a Friedel-Crafts catalyst dissolved in an organic solvent which forms no complex therewith and is liquid at the reaction temperature, the reaction being conducted at a temperature between $-20°$ C. and $-150°$ C. comprising the step of mixing into the polymer an internal-friction reducing agent comprising a stearic acid compound.

2. Process of softening a solid, plastic hydrocarbon interpolymer compound which is reactive with sulfur to give an elastic product prepared by reacting together a major proportion of isobutylene with a minor proportion of a low molecular weight aliphatic diolefin having 4 to 6, inclusive, carbon atoms per molecule in the presence of a Friedel-Crafts catalyst dissolved in an organic solvent which forms no complex therewith and is liquid at the reaction temperature, the reaction being conducted at a temperature between $-20°$ C. and $-150°$ C. comprising the step of mixing into the polymer an internal-friction reducing agent comprising aluminum stearate.

3. Process of softening a solid, plastic hydrocarbon interpolymer compound which is reactive with sulfur to give an elastic product prepared by reacting together a major proportion of isobutylene with a minor proportion of a low molecular weight aliphatic diolefin having 4 to 6, inclusive, carbon atoms per molecule in the presence of a Friedel-Crafts catalyst dissolved in an organic solvent which forms no complex therewith and is liquid at the reaction temperature, the reaction being conducted at a temperature between $-20°$ C. and $-150°$ C. comprising the step of mixing into the polymer an internal-friction reducing agent comprising a hydroxy stearic acid condensate.

4. Process of softening a solid, plastic hydrocarbon interpolymer compound which is reactive with sulfur to give an elastic product prepared by reacting together a major proportion of isobutylene with a minor proportion of a low molecular weight aliphatic diolefin having 4 to 6, inclusive, carbon atoms per molecule in the presence of a Friedel-Crafts catalyst dissolved in an organic solvent which forms no complex therewith and is liquid at the reaction temperature, the reaction being conducted at a temperature between $-20°$ C. and $-150°$ C. comprising the step of mixing into the polymer an internal-friction reducing agent comprising a compound of an organic acid having eighteen carbon atoms per molecule.

5. Process of softening a solid, plastic hydrocarbon interpolymer compound which is reactive with sulfur to give an elastic product prepared by reacting together a major proportion of isobutylene with a minor proportion of a low molecular weight aliphatic diolefin having 4 to 6, inclusive, carbon atoms per molecule in the presence of a Friedel-Crafts catalyst dissolved in an organic solvent which forms no complex therewith and is liquid at the reaction temperature, the reaction being conducted at a temperature between $-20°$ C. and $-150°$ C. comprising the step of mixing into the polymer an internal-friction reducing agent comprising a higher fatty acid ester in the form of di-glycol stearate.

6. Process of softening a solid, plastic hydrocarbon interpolymer compound which is reactive with sulfur to give an elastic product prepared by reacting together a major proportion of isobutylene with a minor proportion of a low molecular weight aliphatic diolefin having 4 to 6, inclusive, carbon atoms per molecule in the presence of a Friedel-Crafts catalyst dissolved in an organic solvent which forms no complex therewith and is liquid at the reaction temperature, the reaction being conducted at a temperature between −20° C. and −150° C. comprising the step of mixing into the polymer an internal-friction reducing agent comprising a plastic aliphatic condensate in the form of a hydroxy stearic acid ester condensate.

7. In combination a synthetic solid plastic hydrocarbon interpolymer compound polymerized from a major proportion of isobutylene with a minor proportion of a conjugated diolefin having 4 to 6, inclusive, carbon atoms per molecule, the polymer being characterized by a low unsaturation below an iodine number of 50, a molecular weight above 15,000, reactivity with sulfur to yield an elastic product and a stearic compound internal-friction reducing agent.

8. In combination a synthetic solid plastic hydrocarbon interpolymer compound polymerized from a major proportion of isobutylene with a minor proportion of a conjugated diolefin having 4 to 6, inclusive, carbon atoms per molecule, the polymer being characterized by a low unsaturation below an iodine number of 50, a molecular weight above 15,000, reactivity with sulfur to yield an elastic product and an internal-friction reducing agent comprising a solid stearic acid ester.

9. In combination a synthetic solid plastic hydrocarbon interpolymer compound polymerized from a major proportion of isobutylene with a minor proportion of a conjugated diolefin having 4 to 6, inclusive, carbon atoms per molecule, the polymer being characterized by a low unsaturation below an iodine number of 50, a molecular weight above 15,000, reactivity with sulfur to yield an elastic product and an internal-friction reducing agent comprising a solid stearic acid ester in the form of diglycol stearate.

10. A synthetic solid plastic hydrocarbon interpolymer compound polymerized from a major proportion of isobutylene, with a minor proportion of a conjugated diolefin having 4 to 6, inclusive, carbon atoms per molecule, the polymer being characterized by a low unsaturation below an iodine number of 50, a molecular weight above 15,000, reactivity with sulfur to yield an elastic product and an internal-friction reducing agent comprising a hydroxy stearic acid condensate.

11. A synthetic solid plastic hydrocarbon interpolymer compound polymerized from a major proportion of isobutylene with a minor proportion of a conjugated diolefin having 4 to 6, inclusive, carbon atoms per molecule, the polymer being characterized by a low unsaturation below an iodine number of 50, a molecular weight above 15,000, reactivity with sulfur to yield an elastic product and an internal-friction reducing agent comprising a hydroxy stearic acid ester condensate.

12. A synthetic solid plastic hydrocarbon interpolymer compound polymerized from a major proportion of isobutylene with a minor proportion of a conjugated diolefin having 4 to 6, inclusive, carbon atoms per molecule, the polymer being characterized by a low unsaturation below an iodine number of 50, a molecular weight above 15,000, reactivity with sulfur to yield an elastic product and an internal-friction reducing agent comprising a compound of an organic acid having eighteen carbon atoms per molecule.

ROBERT M. THOMAS.
FRANCIS P. BALDWIN.